United States Patent
Meyer et al.

[15] 3,645,717
[45] Feb. 29, 1972

[54] PROCESS OF PRODUCING SPONGE IRON PELLETS

[72] Inventors: Kurt Meyer, Frankfurt; Hans Rausch, Oberursel; Wilhelm Thumm, Frankfurt, all of Germany

[73] Assignee: Metallgesellschaft A.G., Frankfurt am Main, Germany

[22] Filed: Apr. 9, 1969

[21] Appl. No.: 814,814

[30] Foreign Application Priority Data

Apr. 17, 1968 Germany .....................P 17 58 171.4

[52] U.S. Cl. .....................................................75/33, 75/5
[51] Int. Cl. .............................................................C21b 13/08
[58] Field of Search ............................................75/5, 33, 34

[56] References Cited

UNITED STATES PATENTS

| | | | |
|---|---|---|---|
| 2,792,298 | 5/1957 | Freeman | 75/33 X |
| 3,365,339 | 1/1968 | Beggs et al. | 75/5 X |
| 3,375,098 | 3/1968 | Marshall | 75/34 X |
| 3,428,445 | 2/1969 | Rausch et al. | 75/33 X |

*Primary Examiner*—L. Dewayne Rutledge
*Assistant Examiner*—J. Davis
*Attorney*—Burgess, Dinklage & Sprung

[57] ABSTRACT

Improvements in the production of iron by the direct reduction of iron ore, wherein the iron ore is admixed with about 5 to 25 weight percent fine-grained metallic iron without any carbonaceous material added to the admixture; the admixture is pelletized and the pellets are fired at about 700° to 1,050° C. in either a slightly oxidizing, a neutral, or a slightly reducing atmosphere. The pellets produced by such firing have an iron to oxygen mol ratio of about 1:1 to 1:1.4. These pellets are then directly reduced with solid and/or gaseous reducing agents at about 650° to 1,250° C. but below the softening temperature of the charge. The product resulting from the reduction is about 70 to 100 weight percent metallic iron, has superior shrinkage as compared to prior art products, has a greater crushing strength and has a lesser tendency to reoxidize than prior art products.

12 Claims, No Drawings

PROCESS OF PRODUCING SPONGE IRON PELLETS

The present invention relates to a process producing reduced iron ore pellets containing 70–100 percent metallic iron by the firing and direct reduction of such pellets.

It is known to prepare fine-grained raw materials, particularly ores, especially iron ores, for shipment and further processing by pelletizing the ores. The pelletizing may be preceded, if desired, by a concentrating treatment, such as flotation, magnetic separation or sink-float separation. Pelletizing is a process whereby the fine-grained raw materials, which have been moistened, are formed into lumps by causing them to roll on inclined rotating surfaces, e.g., in a granulating drum or on a pelletizing disc. The resulting agglomerates are spheroidal and may be subsequently hardened by a heat treatment, e.g., on a travelling grate.

In most pellet-firing processes which have been proposed, it is desired to attain a maximum crushing strength. This is desirable particularly in order to withstand transit involving a plurality of reloading operations and to withstand the conditions in a blast furnace.

According to a more recent development, the fired pellets are not processed in a blast furnace but are directly reduced to produce sponge iron, which is subsequently processed, e.g., in an electric furnace. The direct reduction is preferably carried out in a rotary kiln. The oxidic iron ore pellets which have been fired are usually charged to the rotary kiln together with carbonaceous admixtures and are reduced to sponge iron at temperatures below the softening temperature (Printed German Application No. 1,199,296).

Numerous efforts have been made to simplify and improve this mode of processing iron ore pellets. For instance, it has been proposed to subject the pellets to a partial or complete reduction by solid carbon in a rotary kiln without previously hardening the pellets in a preceding firing unit. In this case, the green pellets are heated at a high rate in the first portion of the rotary kiln (Printed German Application No. 1,224,337).

In a development of this operation it has been found that the green pellets to be subjected to a partial or complete reduction in a rotary kiln will safely travel through the kiln even if they are not heated at a high rate, provided that fine-grained sponge iron in amounts up to 25 percent is added to the ore before or during the pelletizing and the green pellets are charged to the rotary kiln approximately at or near the top end thereof (Printed German Application No. 1,250,462).

In a substantially similar process, sponge iron is produced in a shaft kiln in which reducing gases are employed for a direct reduction of ore pellets, which contain fine-grained metallic iron and which have not been fired and may not even have been dried (French Pat. Specification No. 1,479,963).

The direct reducing process with its numerous improvements has resulted in considerable advances in the technology of processing iron ore but the previously known processes have certain disadvantages which sometimes cause the end product to fall short of the requirements at least in some respects.

Such disadvantages include, for example, high porosity and/or low strength often exhibited by the sponge iron pellets and often lead to the formation of a large amount of abraded fines and a strong reoxidation of the metallic iron. This renders the transport of the sponge iron pellets more difficult.

It is therefore an object of this invention to provide a novel process for reducing iron ore which overcomes the disadvantages of prior processes.

Other and additional objects of this invention will become apparent from a consideration of this entire specification including the claims hereof.

In accord with and fulfilling these objects, one aspect of this invention resides in an iron ore reduction process comprising pelletizing a substantially carbon free mixture consisting of oxidic iron ore and 5 to 25 weight percent fine-grained metallic iron; firing said pellets at about 700° to 1,050° C. in a slightly oxidizing to slightly reducing atmosphere to form fired pellets having an iron-to-oxygen mole ratio of about 1:1 to 1:1.4; and reducing such fired pellets with solid and/or gaseous reducing agents at temperatures of about 650° to 1,250° C. but below the softening temperature of the charge to produce reduced iron ore pellets containing about 70 to 100 weight percent metallic iron.

The pellets are considered to be substantially free of carbon if carbonaceous material has not been added to the ore before or during the pelletizing and any small carbon content of the pellets has its origin in the ore itself.

The definition of the average oxidation stage of the ore in the completely fired pellet by the Fe:O mole ratio of 1:1.0 to 1:1.4 means that the sum formula of the various iron oxide phases in the pellet should be between $FeO$ and $FeO_{1.4}$ (or $Fe_2O_{2.8}$).

It is apparent from the definition of the atmosphere which is suitable for the heat treatment that only the action of said atmosphere in view of the operating conditions and the iron ore is significant. The action under different operating conditions and on other reactants is not significant. Within certain limits, the required composition of the gas atmosphere depends also on the duration of the heat treatment and the amount of metallic iron which has been added. If the heat treatment is of short duration or metallic iron is added in an amount at the upper limit of the claimed range, a higher oxygen partial pressure will be tolerable in the gas atmosphere than with a heat treatment of longer duration or an addition of metallic iron in an amount at the lower limit of the claimed range. The success of the pellet-firing process of this invention depends decisively on the presence of fired pellets having an average Fe:O mole ratio in the critical range of 1:1.0 to 1:1.4.

In slightly oxidizing gases the content of free oxygen should not exceed 6.5 percent by volume unless free oxygen is compensated by reducing constituents. Such gas atmosphere may, for example, have the following composition in percent by volume:

| | |
|---|---|
| $O_2$ | 0.5–6.5 |
| $H_2O$ | 5–10 |
| $CO_2$ | 12–22 |
| $CO$ | 0.3–1.0 |
| $N_2$ | balance |

Neutral atmospheres which are suitable for commercial operations are formed, e.g., of nitrogen or of mixtures of $CO_2$ and $H_2O$ or of $N_2$, $CO_2$ and $H_2O$. A neutral atmosphere may contain oxidizing and reducing constituents, provided that their activities compensate each other under the conditions of the pellet-firing operation.

A slightly reducing atmosphere may have a composition within the ranges defined below in percent by volume:

| | |
|---|---|
| $H_2$ | 1–4 |
| $C_nH_m$ | 0.2–1 |
| $CO_2$ | 10–18 |
| $H_2O$ | 7–14 |
| $O_2$ | 0.1–1 |
| $N_2$ | balance |

The fine-grained metallic iron which is used consists preferably of sponge iron, e.g., of abraded fines obtained in a direct reduction process and/or of ground sponge iron pellets. Iron filings and other waste iron formed in machining processes may also be used, provided that they are sufficiently fine grained. The iron particles will be sufficiently fine-grained if 100 percent are below 300 microns and 70 percent are below 100 microns.

The pellets are preferably dried before they are fired. They may be dried on the firing unit.

The optimum pellet-firing temperature will depend on the intended further processing of the fired iron ore pellets. If the fired pellets are directly charged to the reducing stage, firing temperatures in the lower part of the range defined will be sufficient. If an interim transport is required, the firing temperature will be in the upper part of the stated range to improve the strength of the pellets. A preferred firing temperature range is 900°–1,000° C.

The process according to the invention may be applied to magnetitic and hematitic ores. With hematitic ores, it is generally recommendable to add more fine-grained metallic iron than with magnetitic ores, particularly if the fine-grained metallic iron is added in an amount in the lower part of the claimed range.

The green pellets are fired in an apparatus which is usual for this purpose, such as sintering machines having straight or annular sintering grates, rotary hearth furnaces, rotary kilns etc. Sintering machines and rotary hearth furnaces are particularly suitable. In the usual manner, the sintering grate should be protected by a covering on the grate and on the sides, particularly when relatively high firing temperatures are employed.

The time for heating up the charge is generally 5–60 minutes. A holding time of 1–20 minutes is sufficient.

If a direct further processing of the fired pellets is intended, it will be economically desirable to transfer them to the direct reduction stage directly, without interstage cooling. If an immediate further processing of the fired pellets is not intended and particularly if a prolonged transportation is required to the reducing plant, the pellets should be directly or indirectly cooled in such a manner that the average Fe:O mole ratio in the fired pellet remains as constant as possible. The cooling may preferably be effected by inert cooling gases or by water applied in an inert atmosphere. If water is employed for a direct cooling, the water rate should be controlled so that the fired pellets have a final temperature of about 200° C. This will ensure that the pellets will not absorb moisture, which would adversely affect their strength.

If the firing of the green pellets is directly succeeded by the further processing of the fired pellets, hot exhaust gases from the direct reduction unit will preferably be used as firing gases for heat treating the green pellets. Usually about 40–70 percent of the waste gases are sufficient for this purpose. When the gases have delivered their sensible heat in the firing unit, they are supplied from the latter to a combustion furnace, in which the remaining exhaust gases from the direct reduction stage are burnt to produce steam.

In another development of the process, part of the exhaust gases from the direct reduction stage are afterburnt and the required portion of the afterburnt gases is used in a mixture with the remaining gases from the direct reduction stage, which remaining gases are not afterburnt.

It was previously believed in the art that the quality of fired pellets depends mainly on their crushing strength. The investigations which have lead to the teaching of this invention have shown that in addition to the crushing strength of the pellets those effects which are produced in the succeeding direct reduction stage, namely, the change of volume, pore development and abrasion of fines, are just as or even more significant. For instance, an increase in volume often results in fissured or crushed pellets, which are undesirable during the reducing treatment because they involve a formation of large amounts of abraded fines. A pellet which is apparently inferior from the aspect of its crushing strength alone may perform better in the direct reduction treatment than a pellet which is apparently superior from the crushing strength aspect. For instance, a pellet which has been fired in a highly oxidizing atmosphere by conventional processes will always have a high crushing strength but such pellet adversely affects the kiln operation because a large amount of abraded fines is formed in the reducing stage.

The porosity of pellets is critically dependent on their volume or density. The pellets should be as compact as desired. The process according to the invention has favorable results regarding the change in volume because the swelling of pellets which tend to swell is reduced or such pellets are even caused to shrink whereas pellets which shrink in conventional processes exhibit a larger shrinkage. As a result, the sponge iron pellets produced according to the invention exhibit a relatively low porosity. The above-mentioned risk of reoxidation, which is undesirable, is therefore greatly reduced.

It is another advantage of the process according to the invention that the fines which are abraded during reduction with solid reducing agents can be magnetically or mechanically separated in a simple manner from surplus reducing agent.

The following nonlimiting examples illustrate the process according to the invention:

EXAMPLES

Sponge iron pellets were made in five test runs. In these test runs, the following raw materials were used:

1. Magnetite (Palabora) having the following screen analysis: 88 percent below 40 microns, 100 percent below 100 microns, and a total iron content of 67 percent, calculated as Fe.

2. Magnetite (New Zealand) having the following screen analysis: 79 percent below 45 microns, 100 percent below 100 microns, and a total iron content of 61 percent, calculated as Fe.

3. Magnetite (Öxelösund) having the following screen analysis: 90 percent below 40 microns, 100 percent below 100 microns, and a total iron content of 72 percent, calculated as Fe.

4. Hematite (Acos Finos Piratini) having the following screen analysis: 90 percent below 40 microns, 100 percent below 100 microns, and a total iron content of 69 percent, calculated as Fe.

5. Hematite (Hammersley) having the following screen analysis: 85 percent below 40 microns, 100 percent below 100 microns, and a total iron content of 68 percent, calculated as Fe.

The ores contained an admixture of 0.5 percent bentonite alone or with a further admixture of 5 percent, 10 percent and 20 percent sponge iron, respectively, and were shaped in a moistened state on a pelletizing disc into green pellets which were 10–12 millimeters in diameter. In the sponge iron which was employed, 90–95 percent of the total iron content was present in metallic form and the rest in oxidic form. Its screen analysis was 100 percent below 60 microns.

The green pellets were dried at 105° C.

In an electrically preheated muffle furnace, the dried pellets were heated by flue gases to a firing temperature of 1,000° within 24–28 minutes and were held at this temperature for 2 to 6 minutes. The flue gases were passed at a rate of 1.2 standard cubic meters per kilogram through the pellet charge in the muffle furnace. The flue gases consisted of a slightly oxidizing gas mixture containing, by volume, 6.2 percent $O_2$
9.5 percent $H_2O$
15.1 percent $CO_2$
69.2 percent $N_2$ or of a neutral gas mixture containing, by volume, 13 percent $H_2O$
20 percent $CO_2$
67 percent $N_2$ or a slightly reducing gas mixture containing, by volume, 13.6 percent $H_2O$
14.0 percent $CO_2$
8.0 percent CO
64.4 percent $N_2$ The completely fired pellets together with the same amount of anthracite having a particle size of 2–6 millimeters and 5 percent dolomite having a particle size of 1–2 millimeters (used as desulfurizing agent) were subjected to a direct reduction treatment. The direct reduction was effected at a temperature of 1,100° C. within 1 hour in an electrically heated rotary kiln having an inside diameter of 15 centimeters and rotated at 11 rotations per minute. The reduced pellets where cooled in nitrogen.

The cooled pellets were screened from the material discharged from the furnace. The screen-passing fraction was subjected to magnetic separation to separate the abraded fines from coal, dolomite and ash.

In a parallel test, pellets were produced which were fired under the same conditions and their crushing strength was determined.

The test results are compiled in the following table. Column 1 states the example numbers of the tests, Column 2 the amount in which sponge iron is added and Column 3 the nature of the flue gas used to fire the pellets, "ox" indicating the slightly oxidizing atmosphere having the above-mentioned composition, "red" the slightly reducing atmosphere having the above-mentioned composition, and "n" the neutral atmosphere. Column 4 states the mean crushing strength of the fired pellets in kilograms per pellet and Column 5 the mean crushing strength of the reduced pellets in kilograms per pellet. Column 6 states the change in volume in percent, based on the fired pellets. The change in volume caused by the abrasion of fines has been taken into account. The amount of abraded fines in percent of the amount of pellets which were charged is stated in Column 7.

TABLE

| Example Number | Admixture of sponge iron, percent | Composition of firing gas atmosphere | Mean crushing strength of fired pellets, kg./pellet | Mean crushing strength of reduced pellets, kg./pellet | Change in volume, percent | Abraded fines, percent |
|---|---|---|---|---|---|---|
| Magnetite (Palabora) | | | | | | |
| 1 | 0 | ox | 23.6 | 59 | 26.2 | 2.9 |
| 2 | 10 | ox | 81 | 184 | 12.7 | 3.7 |
| 3 | 10 | red | 32 | 170 | −2.6 | 3.5 |
| 4 | 20 | ox | 80 | 224 | −2.1 | 4.0 |
| 5 | 20 | n | 56 | 205 | −13.8 | 3.5 |
| 6 | 20 | red | 35.4 | 207 | −12.8 | 4.0 |
| Magnetite (New Zealand) | | | | | | |
| 7 | 0 | ox | 84 | 95 | −3.7 | 5.0 |
| 8 | 10 | ox | 93 | 120 | −6.3 | 3.4 |
| 9 | 10 | red | 53 | 161 | −7.4 | 3.8 |
| Magnetite (Oxelosund) | | | | | | |
| 10 | 0 | ox | 37 | 142 | 6.5 | 5.3 |
| 11 | 5 | n | 125 | 260 | 5.0 | 4.2 |
| 12 | 5 | red | 124 | 336 | 5.6 | 2.7 |
| 13 | 10 | n | 138 | 393 | −8.4 | 1.9 |
| 14 | 10 | ox | 73 | 380 | 0 | 5.2 |
| 15 | 10 | red | 107 | 313 | 3.4 | 3.4 |
| Hematite (Acos Finos Piratani) | | | | | | |
| 16 | 0 | ox | 9 | 233 | 8.6 | 14.4 |
| 17 | 10 | ox | 10 | 305 | −2.4 | 3.8 |
| 18 | 10 | red | 20 | 289 | −0.3 | 4.4 |
| 19 | 20 | n | 103 | 383 | −9.5 | 3.8 |
| 20 | 20 | red | 89 | 405 | −14.4 | 2.9 |
| Hematite (Hammersley) | | | | | | |
| 21 | 0 | ox | 9.1 | 420 | −14.7 | 28.7 |
| 22 | 10 | ox | 24.0 | 348 | −21.8 | 3.0 |
| 23 | 10 | red | 33.4 | 409 | −23.4 | 2.2 |

It is apparent from the test results that in virtually all cases the crushing strength of the sponge iron pellets made by the process according to the invention is higher and partly much higher than the crushing strength of sponge iron pellets made by conventional processes. In addition to the mechanical aspect, the higher crushing strength is also significant for the tendency of the sponge iron pellets to reoxidize.

The process according to the invention has also a beneficial influence on the change in volume and on the porosity, which varies in the same sense. The addition of sponge iron highly reduces the swelling of the pellets (see 1,2 and 10, 14, 15). Even a shrinkage is possible (see 1, 3–6 and 16–20). The shrinkage of pellets which tend to shrink anyway is increased by the incorporation of sponge iron (see 7–9 and 21–23). Contrary to magnetitic pellets, hematitic pellets suffer an abrasion of fines in a large amount during the direct reduction as a result of mechanical stress. In this case the process according to the invention greatly reduces the amount of fines which are abraded (see 16–20 and 21–23). Besides, the fines which are abraded in a small amount can easily be separated magnetically or mechanically from coal, dolomite and ash.

What is claimed is:

1. In the process of producing iron from oxidic iron ore wherein said iron ore is directly reduced in pellet form; the improvement which comprises forming a substantially noncarbonaceous mixture of iron ore and about 5 to 25 weight percent fine-grained metallic iron; pelletizing such mixture to form substantially noncarbonaceous pellets, firing said pellets at about 700° to 1,050° C. in the presence of a slightly oxidizing to slightly reducing atmosphere to form fired pellets having an iron-to-oxygen mol ratio of about 1:1 to 1:1.4, and then reducing such fired pellets at about 650° to 1,250° C. in the presence of solid or gaseous reducing agents whereby forming reduced pellets containing about 70 to 100 weight percent metallic iron.

2. The improved process claimed in claim 1 wherein said firing atmosphere is neutral to slightly reducing.

3. The improved process claimed in claim 1 wherein said fine-grained metallic iron is particulate sponge iron.

4. The improved process claimed in claim 1 including drying said pellets after pelletizing and before firing.

5. The improved process claimed in claim 1 wherein said firing is carried out at about 900° to 1,000° C.

6. Improved process claimed in claim 1 wherein said firing is carried out for about 1 to 20 minutes at the maximum firing temperature used.

7. Improved process claimed in claim 1 wherein said firing is carried out on a sintering machine.

8. Improved process claimed in claim 1 wherein said firing is carried out in a rotary hearth furnace.

9. Improved process claimed in claim 1 wherein said pellets are fired by combustion of the exhaust gases of said reducing step.

10. Improved process claimed in claim 1 wherein said fired pellets are directly introduced into said direct reduction without intermediate cooling.

11. Improved process claimed in claim 1 wherein said reducing agent is solid and said direct reduction is carried out in a rotary kiln.

12. Improved process claimed in claim 1 wherein said reducing agent is gaseous and wherein said direct reduction is carried out in a shaft furnace.

* * * * *